US005152142A

United States Patent [19]

Budzich

[11] Patent Number: 5,152,142

[45] Date of Patent: Oct. 6, 1992

[54] NEGATIVE LOAD CONTROL AND ENERGY UTILIZING SYSTEM

[75] Inventor: Tadeusz Budzich, Moreland Hills, Ohio

[73] Assignee: Caterpillar Inc., Peoria, Ill.

[21] Appl. No.: 659,423

[22] PCT Filed: Mar. 7, 1991

[86] PCT No.: PCT/US91/01490

§ 371 Date: Mar. 7, 1991

§ 102(e) Date: Mar. 7, 1991

[51] Int. Cl.[5] .............................................. F16D 31/02

[52] U.S. Cl. ........................................ 60/414; 91/446; 137/596.1

[58] Field of Search ................. 60/328, 414, 428, 461; 91/435, 446; 137/596.1

[56] References Cited

U.S. PATENT DOCUMENTS

| | | | |
|---|---|---|---|
| 3,470,694 | 10/1969 | Budzich . | |
| 4,147,178 | 4/1979 | Budzich | 137/596.1 |
| 4,180,098 | 12/1979 | Budzich | 137/596.13 |
| 4,249,570 | 2/1981 | Budzich | 137/596.13 |
| 4,285,195 | 8/1981 | Budzich | 91/446 |
| 4,330,991 | 5/1982 | Budzich | 60/427 |
| 4,437,307 | 3/1984 | Budzich | 60/427 |
| 4,674,280 | 6/1987 | Stuhr | 60/413 |
| 4,741,248 | 5/1988 | Budzich | 91/446 |
| 4,799,420 | 1/1989 | Budzich | 137/596.1 |

*Primary Examiner*—Thomas E. Denion
*Assistant Examiner*—F. Daniel Lopez
*Attorney, Agent, or Firm*—J. W. Burrows

[57] ABSTRACT

Compensated controls for a negative type load which, without degrading the quality of the control, permit direct use of the fluid power energy of the negative load for control of a resistive or positive type load, thereby greatly increasing the efficiency of the control system.

28 Claims, 6 Drawing Sheets

NEGATIVE LOAD CONTROL AND ENERGY UTILIZING SYSTEM

TECHNICAL FIELD

This invention generally relates to negative load controls and more particularly relates to compensated negative load controls, which divert, during control of negative load, the energy of such load to perform useful work in a hydraulic system, without the energy of the negative load being converted into heat by throttling.

BACKGROUND ART

Without exception all of the hydraulic controls of the present art are based on the principle of throttling, which converts the energy of flow and pressure into heat.

In this specification a negative type load means an aiding type load, while a positive type load means a resistive type load that is a load which absorbs energy supplied from the pump to perform useful work.

During control of positive load, depending on the type of hydraulic system and especially on the type of pump used in the system, various amounts of throttling take place. The less the amount of throttling used in control of a positive load the more efficient the fluid power and control system.

The amount of throttling in control of positive type loads was greatly reduced by the introduction of load responsive, or load sensing systems, in which only a relatively small amount of throttling takes place such as, U.S. Pat. No. 3,470,694, issued Oct. 7, 1969 to T. Budzich.

Through application of the principle of variable pressure differential to such a load responsive system, the efficiency of such system can be still further increased by further reduction in throttling and the already high quality of the control of such a load responsive system and its valves can be further increased. Such a system is shown in U.S. Pat. No. 4,285,195, issue Aug. 25, 1981 to T. Budzich. However, those increases in efficiency and reduction in throttling of these load responsive systems only applies to the control of positive load, while the control of negative load, in all known compensated systems of the present art is done by totally converting, by the throttling process, the pressure-flow energy directly into heat. A typical system is shown in U.S. Pat. No. 3,744,517, issued July 10, 1973 to T. Budzich. Various negative load controls of the present art have this common feature. The only difference between those controls being the quality of the control, which for example was greatly improved through application of the concept of compensation.

Generation of heat, by throttling the fluid, not only represents a reduction in the efficiency of the system, but also introduces other parasitic effects, like for example an increase in temperature of the working fluid, necessitating the use of heat exchangers of various types and generally reducing the useful life of the fluid. Like, for example, the hydraulic oil and increasing the hazard to the operators of such systems.

DISCLOSURE OF THE INVENTION

In one aspect of the present invention a fluid power and control system is provided having a valve assembly interposed between an outlet port of a fluid motor which controls a negative type load and subjected to negative load pressure, fluid exhaust means maintained at a relatively low pressure level and absorbing means maintained at a relatively high variable pressure level during control of the negative load. The valve assembly comprises flow control means operative to control the velocity of fluid flow from the fluid motor in response to an external control signal so that the velocity of the fluid motor can be controlled at a relatively constant level proportional to the magnitude of the external control signal and independent of the magnitude of the negative load pressure. The flow control means includes flow sensing means for sensing the magnitude of the fluid flow from the fluid motor, fully throttling means for directing fluid flow from the fluid motor to the exhaust means, and recovery means for diverting on a priority basis fluid flow from the fluid motor to the absorbing means. The recovery means is operatively responsive to the flow sensing means.

It is therefore a principal object of this invention to use the energy of the negative load in a hydraulic system to perform useful work in control of positive loads, without the energy being converted, by throttling, into heat.

It is another object of this invention to use the flow and pressure, generated in control of negative load, to supplement directly the pump flow, thus reducing the size of the system pump.

It is another object of this invention to reduce the amount of heat generated by throttling in control of negative load, thus reducing the temperature of the system oil.

It is another object of this invention to divert the flow at negative load pressure in control of negative load, without degrading the quality of the control.

It is another object of this invention to divert the flow at negative load pressure without converting the energy of such flow into heat, while using the compensating controls of the negative load without degrading the high quality of such controls.

It is another object of this invention to divert, on a priority basis, the flow at negative load pressure to control positive type loads, within the capability of the control system to absorb such flow and pressure energy and to throttle the excess flow by a throttling type compensated control, in order to maintain the quality of the control.

It is still another object of this invention to reduce the amount of throttling performed by the negative load controls by diverting some of the flow into the recovery circuit thus reducing the flow forces induced by throttling in the negative load controls, thereby increasing the quality of these controls.

It is still another object of this invention to increase the response and stability of the negative load controls of a compensated type, by a reduction in the flow forces acting on those controls, especially when controlling large flows at high negative load pressures.

Briefly the foregoing and other additional objects and advantages of this invention are accomplished by providing a new concept in control of negative load, which permits utilization of the energy of the negative load in control of positive type loads and reduction in the amount of the energy of the negative load converted into heat, without degrading the quality of the negative load controls, thereby increasing the efficiency of the system and reducing the temperature of the working fluid.

Additional objects of this invention will become apparent when referring to the preferred embodiments of this invention as shown in the accompanying drawings and described in the following detailed description.

DESCRIPTION OF THE PREFERRED EMBODIMENTS

Figure 1:
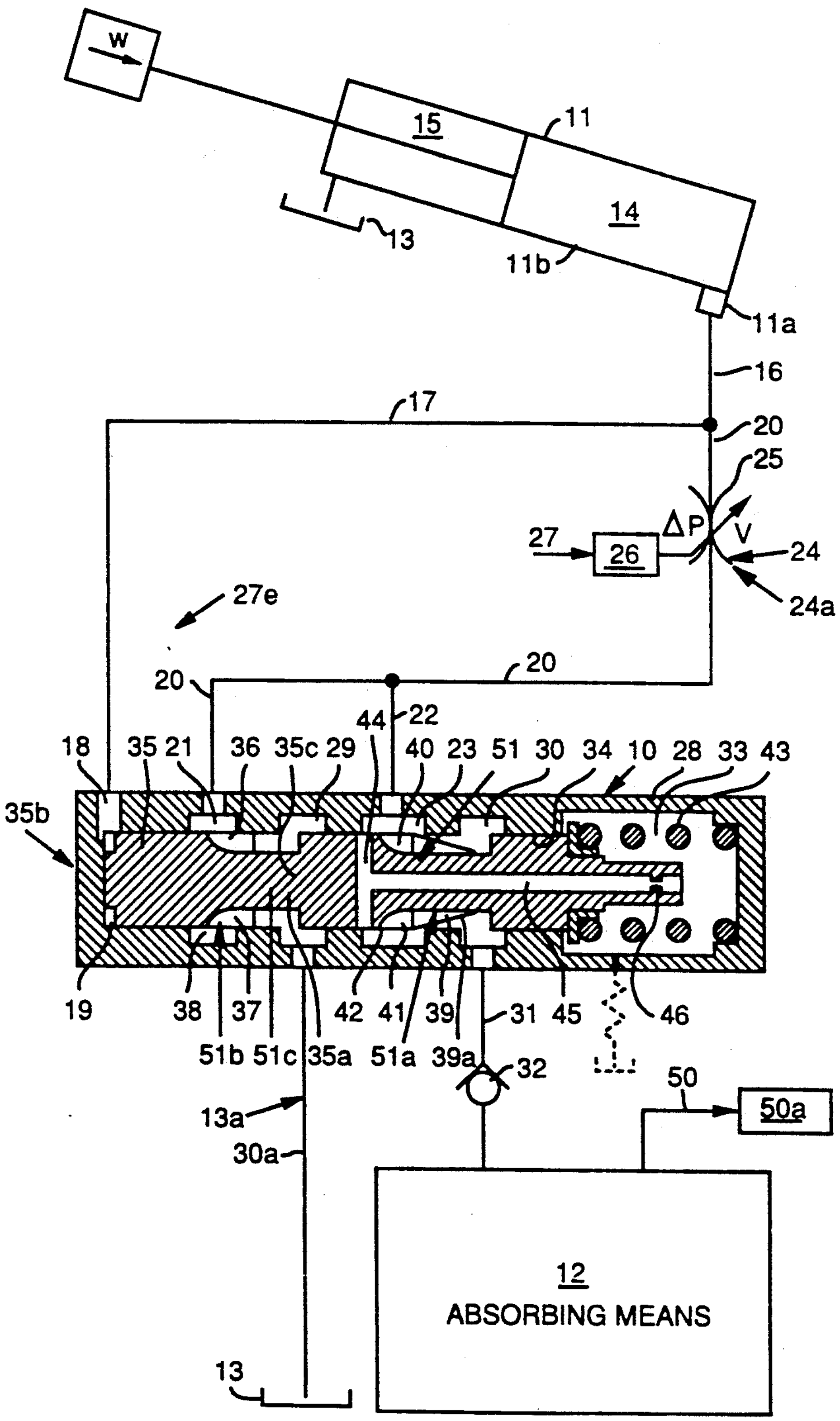
FIG. 1 is a longitudinal sectional view of a compensated control for use in control of negative load, with a fluid motor, system reservoir and system lines shown schematically.

Referring now to FIG. 1, a valve assembly, generally designated as 10, is shown interposed between a fluid motor 11 of a cylinder type **11*b*, well known in the art, which is subjected to a unidirectional load W, and absorbing means 12 and fluid exhaust means 13*a*. The fluid motor 11, subjected to negative load W, has a piston chamber 14 and a piston rod chamber 15 connected through the fluid exhaust means 13*a* to reservoir means 13. An outlet port 11*a* of the piston chamber 14, subjected to negative load pressure, is connected by lines 16 and 17 to a port 18 communicating with first control chamber 19 in the valve assembly 10. The piston chamber 14 is also connected by line 20 to a first inlet chamber 21, while also being connected by line 22 with a second inlet chamber 23. Line 20 passes through metering orifice means 24 composed of schematically shown orifice 25, the area of which can be varied by schematically shown means 26 responsive to an external control signal 27. In the embodiment of FIG. 1 variable orifice means 24 provides flow sensing means 24*a*, used to determine outlet flow from fluid motor 11, which in turn provides a control signal 27*e* to the valve assembly 10. Flow sensing means 24*a* is a device measuring directly, or indirectly fluid flow out of fluid motor 11. This measurement of fluid flow can be indirectly established by measuring the velocity of the piston rod of the cylinder type fluid motor 11*b*, once the dimensions of such motor are known, or by measuring the RPM of a rotary type fluid motor 11*c* (FIG. 3), once the volume displacement per revolution of such motor is known. The control signal 27*e* is a signal proportional to fluid flow out of the fluid motor and can be derived either from direct measurement of the fluid flow, velocity of the load, or rotational speed of the load. The control signal 27*e* can be transmitted to flow control means, generally designated as 51*a*, in an electrical, fluid power or mechanical form. In most embodiments, as shown on the drawings in FIGS. 1, 2, and 4, this control signal 27*e*, which indicates the quantity of fluid flow, takes the form of a control pressure differential developed across the orifice 25**.

The valve assembly 10 has a housing 28 provided with an exhaust chamber 29 connected by third duct means **30*a* with reservoir means 13, and a bypass chamber 30 connected by first duct means 31 and check valve means 32 to absorbing means 12. The housing 28 also has a second control chamber 33. The housing 28 is also provided with a bore 34 interconnecting first control chamber 19, the first inlet chamber 21, the exhaust chamber 29, the second inlet chamber 23, the bypass chamber 30 and the second control chamber 33. A first compensating spool means 35 is slidably disposed in the bore 34. The first compensating spool means 35 is provided with fully throttling means 36 including first throttling slots 37 terminating in first cut-off edges 38 and first flow diverting means 39, which includes first low resistance flow passage 39*a*, in communication with first control throttling means 40, including second throttling slots 41 terminating in second cut-off edges 42. Spring biasing means 43, positioned in the second control chamber 33, biases the first compensating spool means 35 towards the position as shown in FIG. 1 and opposes force generating means 35*b*. The second inlet chamber 23 is connected by passages 44 and 45 and damping orifice 46 with second control chamber 33**.

Absorbing means 12 is connected by line 50 with other components **50*a* of the fluid power and control system. Flow control means 51*a* is composed of first compensating spool means 35 including fully throttling means 36, first control throttling means 40, first flow diverting means 39 and is operable to control the pressure differential across the metering orifice means 24, in turn controlling the fluid flow through metering orifice means 24 and therefore in turn controlling the velocity of the negative load W. The flow at negative load pressure, passing through metering orifice means 24, is selectively diverted, in a manner as will be described in greater detail later in the specification, to reservoir means 13 and absorbing means 12. Flow control means 51*a* is a control element which, by controlling the combined fluid flow from the motor 11 to absorbing means 12 with a minimum amount of throttling and fully throttling means 36, controls the fluid flow out of the motor 11 in a way as determined by the magnitude of the control signal 27*e*, while providing priority for the flow to absorbing means 12**.

The first compensating spool means 35 of the flow control means **51*a* of FIG. 1 includes recovery means 51. The recovery means 51 includes the first flow diverting means 39 and the first control throttling means 40 and is positioned between the second inlet chamber 23 and the bypass chamber 30, and the fully throttling means 36 is positioned between the first inlet chamber 21 and the exhaust chamber 29 and is also provided with means 51*b* responsive to control signal 27*e*. The means 51*b* responsive to the control signal 27*e* is part of the flow control means 51*a* and controls by the action of the force generating means 35*b* the throttling action of the fully throttling means 36 and the bypass action of the recovery means 5. Means 51***c* responsive to the pressure differential across the variable orifice means 24 is also part of the flow control means 51*a* and includes the cross-sectional area of compensating spool means 35 subjected to upstream and downstream pressures existing at metering orifice means 24. Recovery means 51 and fully throttling means 36 are connected by stem 35*c* and constitute first flow priority means 35*a*. First priority means 35*a* of the embodiment of FIG. 1 is established by relative placement of recovery means 51 in respect to fully throttling means 36, on the first compensating spool means 35.

Figure 2:
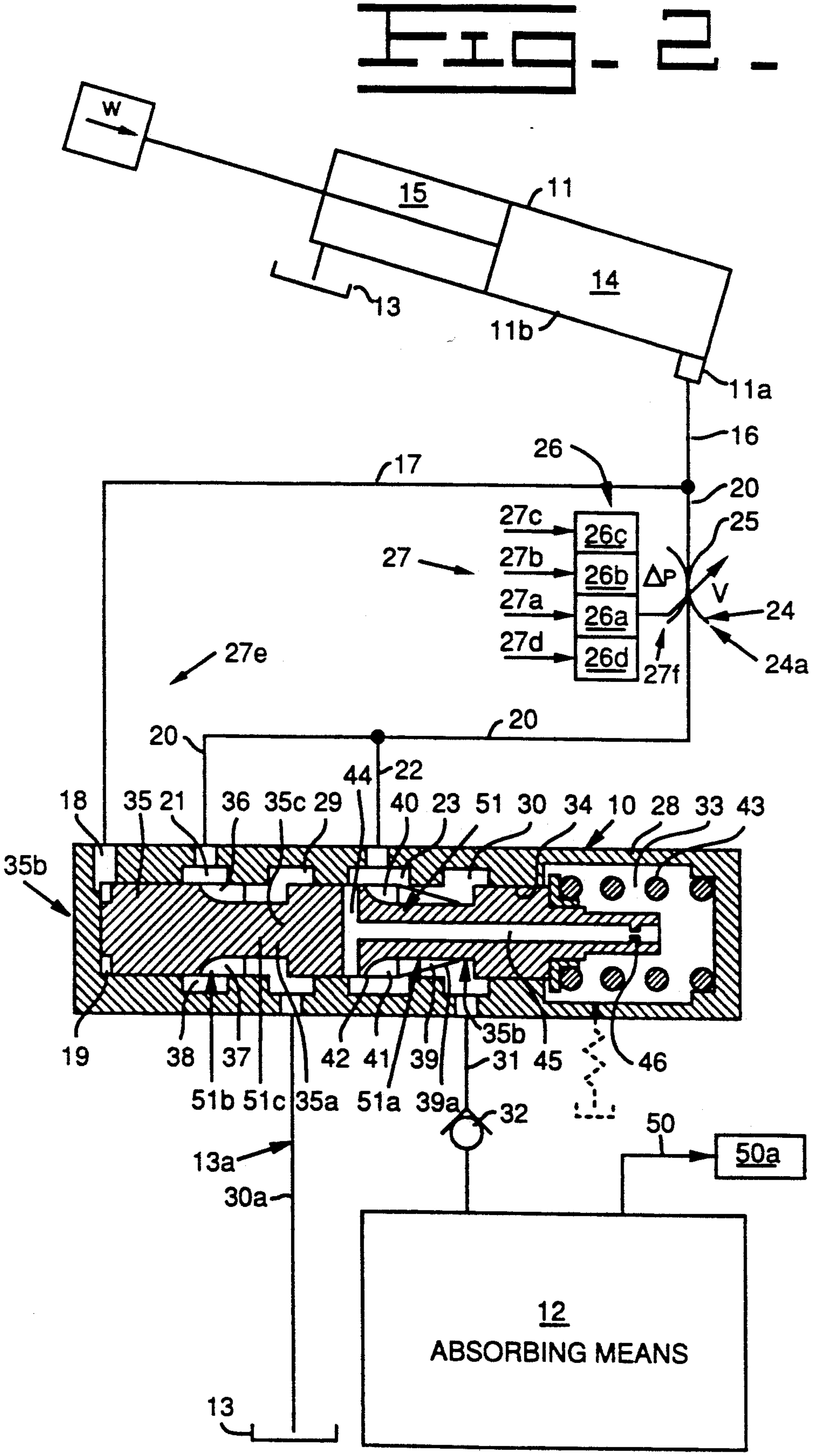
FIG. 2 is a longitudinal sectional view of a compensated control for use in control of negative load using system components identical to those shown in FIG. 1, but provided with control elements responding to different types of control signals.

Referring now to FIG. 2, the fluid power and control system of FIG. 2 is very similar to that of FIG. 1 and like components are designated by like numerals. The valve assembly 10 of FIG. 2 is identical to that of FIG. 1 and so are the other major system components. In the embodiments of most of the figures of this invention, sensing means 24*a* is in the form of a variable orifice 25, well known in the art. Means 26, operable to change the area of the metering orifice means 24, not only can be influenced by the type of sensing means 24*a*, but also by the specific requirements for generation of the control signals used in the fluid power and control system. In FIG. 2 four different types of means 26, namely means 26*a*, 26*b*, 26*c* and 26*d* are schematically shown. Although a combination of means 26 can be used, it is most likely that only one type of means, namely 26*a*, 26*b*, 26*c* or 26*d*, will be used at one time. Likewise, the external control signal 27 can be generated in various forms as schematically illustrated in FIG. 2. These four types of external control signal 27*a*, 27*b*, 27*c* and 27*d* could be used in combination, but normally would be used individually. Means 26*a* responding to the external control digital signal 27*a* is of an electrical digital type and may take many forms, well known in the art, like for example a stepper motor. Means 26*b* responds to an electrical analog type signal 27*b* and can be in the form of a solenoid. Means 26*c* responds to a fluid power type control signal 27*c* and can be some type of fluid motor and means 26*d* responds to a mechanical type control signal 27*d*, which, in a well known manner, can be manually generated. If flow sensing means 24*a* is in the form of a variable orifice, the output of means 26*a*, 26*b*, 26*c* and 26*d* is usually of a mechanical type, in the form of linear displacement or angular displacement. The sensing means 24*a* includes means 27*f* operable to sense the pressure differential across the variable orifice means 24.

Figure 3:
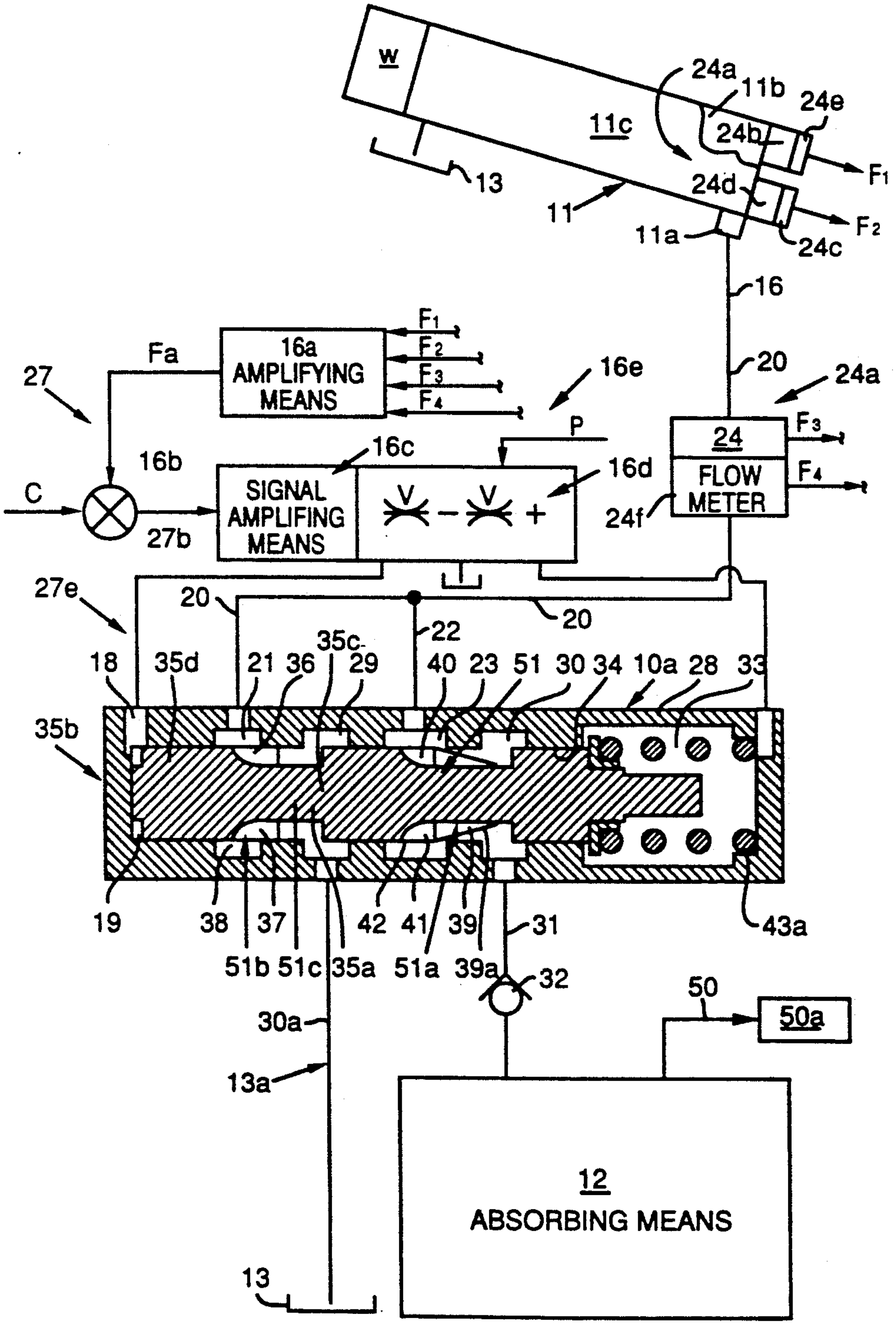
FIG. 3 is a longitudinal sectional view of a two stage negative load compensating control with various sensing elements, signal amplifier, first stage control, system reservoir and negative load energy converting device shown schematically.

Referring now to FIG. 3, the fluid power and control system of FIG. 3 is very similar to that of FIG. 1 and like components are designated by like numerals. The valve assembly 10*a* of FIG. 3 is similar to the valve assembly 10 of FIG. 1, the only difference between the control valves 10 and 10*a* being that in valve assembly 10*a* a spool 35*d* is not provided with passages 44 and 45, which are present in the first compensating spool 35 of FIG. 1. Also a spring 43*a* of FIG. 3 performs a different function and has different characteristics from spring biasing means 43 of FIG. 1. The basic difference between the systems of FIGS. 1 and 3 is that the valve assembly 10*a* of FIG. 3 is of a two stage type and the system is provided with a servo type control 16*e* which includes amplifying means 16*a*, differential amplifier 16*b* which responds to an external control signal 27 in the form of command signal C, signal amplifying means 16*c*, and a first stage control 16*d*. The first stage control 16*d*, well known in the art, which may have a pilot valve amplifying section of a valve known in the art as shown in U.S. Pat. No. 4,333,389, issued to T. Budzich on June 8, 1982, or can be a first stage of a well-known servo valve of a flapper-nozzle type. The signal amplifying means 16*c* may take the form of a torque motor driving a flapper-nozzle assembly. In this form the first stage control 16*d* responds to an electrical analog type control signal 27*b*, which in a closed loop servo system can be a well-known error signal. The servo type control 16*e* of FIG. 3 can respond to flow control signal $F_1$, $F_2$, $F_3$, or $F_4$ generated by different types of the sensing means 24*a*.

If the valve assembly 10*a* of the system had perfect flow metering characteristics, the flow represented by the flow control signals $F_1$, $F_2$, $F_3$, or $F_4$ would be the same as requested by the command signal C. However, since that is not totally realistic, the flow control signals $F_1$, $F_2$, $F_3$, and $F_4$ become feedback signals to correct through the analog control signal 27*b*, which can be an error signal, the actual flow to the desired flow as represented by the command signal C (which can be external control signal 27).

The sensing means 24*a* can be in the form of a control signal generating means 24*b* responsive to the linear velocity of the cylinder type fluid motor 11*b* as shown in FIG. 3 as a fragmented portion of the fluid motor 11. It should be recognized that the fragmented portion 11*b* could be readily applied to any cylinder type fluid motor without departing from the essence of the invention. The control signal generating means 24*b* is provided with a signal generating means 24*e* which generates the flow control signal $F_1$. The sensing means 24*a* can also be in the form of a control signal generating means 24*d* responsive to the angular velocity of a rotary type fluid motor 11*c*. The signal generating means 24*d* is provided with a signal generating means 24*c* which generates the flow control signal $F_2$. As previously described, the sensing means 24*a* could be in the form of a control orifice means 24 to establish a pressure differential $\Delta P$ and generate the flow control signal $F_3$. Furthermore the sensing means 24*a* could be in the form of a flow meter 24*f*, well-known in the art, to generate the flow control signal $F_4$. Each of these flow control signals $F_1$, $F_2$, $F_3$, and $F_4$ can either directly become the control signal 27*e* to valve assembly 10 or through the closed loop servo type control 16*e* effectively become the control signal 27*e* responsive to the command signal C.

The amplifying means 16*a* of the servo type control 16*e* receives the respective flow control signals $F_1$, $F_2$, $F_3$, $F_4$ and directs a feedback signal $F_a$ to the differential amplifier 16*b* which is responding to the external command signal C. An error signal 27*b* is generated by the differential means 16*b* and directed to the signal amplifying means 16*c* and the first stage control 16*d*. The first stage control 16*d* conditions a power input P to produce the control signal 27*e*.

Figure 4:
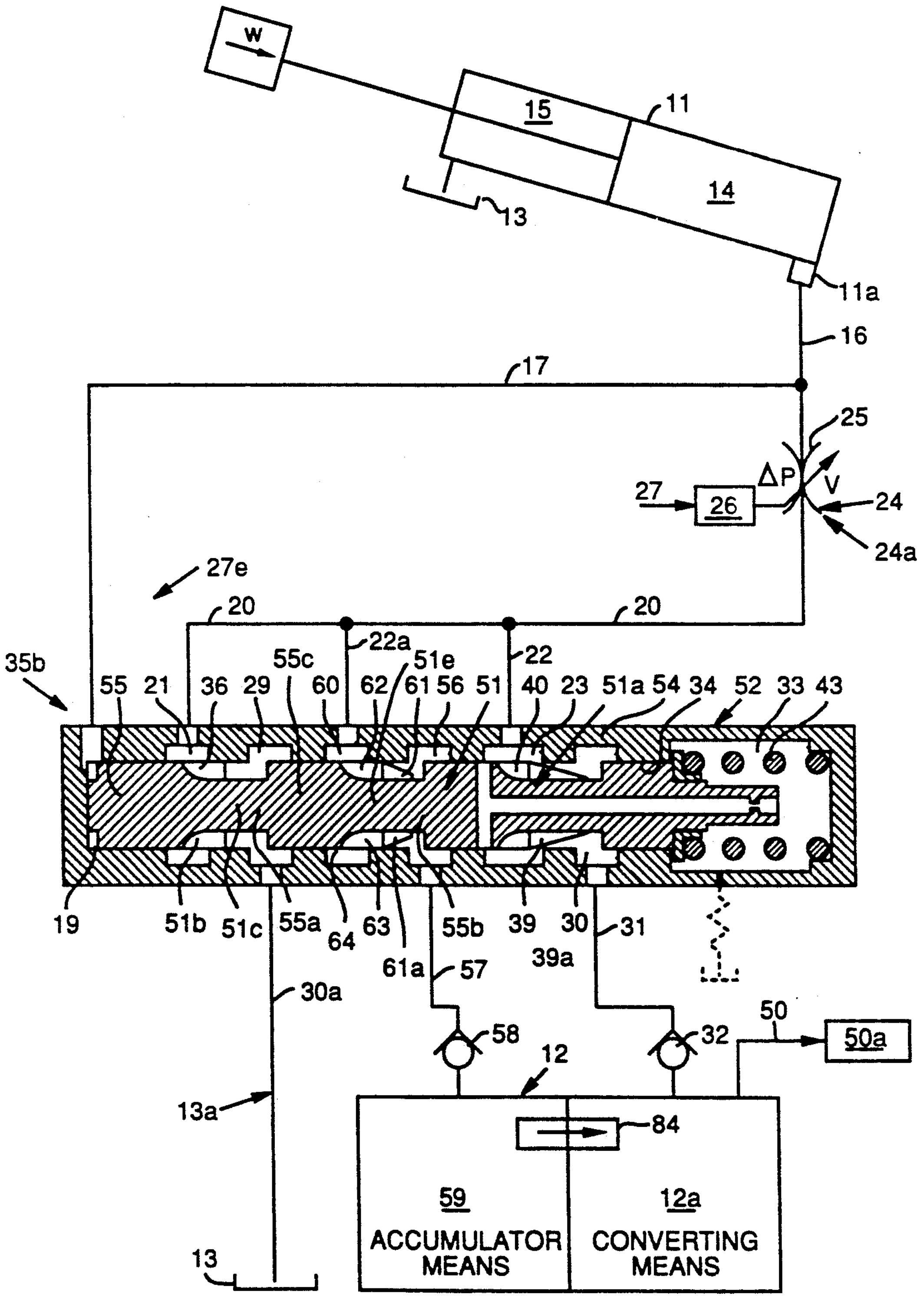
FIG. 4 is a longitudinal sectional view of a compensated control operable to divert negative load flow and pressure to schematically shown negative load energy converting device and also to an accumulator device, with fluid motor and power transmitting lines shown schematically.

Referring now to FIG. 4 the fluid power and control system of FIG. 4 is very similar to that of FIG. 1 and like components are designated by like numerals. A control valve, generally designated as 52, is interposed between the outlet port 11*a* of the cylinder type fluid motor 11 and the absorbing means 12 and reservoir means 13. The absorbing means 12 includes converting means 12*a* and accumulator means 59. A housing 54 is provided with a second compensating spool means 55 in sliding engagement with the bore 34 and which is slightly different from the first compensating spool means 35 of FIG. 1. The only difference between control valves 10 and 52 is that an additional bypass chamber 56 is provided and communicates through second duct means 57 and second check valve means 58 with accumulator means 59, while also a third inlet chamber 60 is provided and connected to line 20 by line 22*a*. The second compensating spool means 55 is provided with second flow diverting means 61, including second low resistance flow passage 61*a*, and is connected to second control throttling means 62, which includes third throttling slots 63 terminating in third cut-off edges 64.

Flow control means 51*a* of FIG. 4 includes second compensating spool means 55 provided with recovery means 51 positioned between the second inlet chamber 23 and the bypass chamber 30. Recovery means 51 includes first flow diverting means 39 and first control throttling means 40. Fully throttling means 36 is positioned between first inlet chamber 21 and exhaust chamber 29. Second means 51*e* responsive to the control signal 27*e* including the second control throttling means 62 is positioned between third inlet chamber 60 and bypass chamber 56 and includes second flow diverting means 61. Fully throttling means 36, second control throttling means 62 and first control throttling means 40 are positioned on second compensating spool means 55 in such a way that they constitute first flow priority means 55*a*, second priority means 55*b*, and third priority means 55*c*. First flow priority means 55*a*, of the embodiment of FIG. 4, is established by relative placement of first flow diverting means 39 in respect to second flow diverting means 61 on second compensating spool means 55. Second priority means 55*b* of the embodiment of FIG. 4 is established by relative placement of second flow diverting means 61 in respect to fully throttling means 36 on the second compensating spool 55. The above combination of converting means 12*a* and accumulator means 59 in FIG. 4 is provided with flow control and transfer means schematically shown and generally designated as 84.

Figure 5:
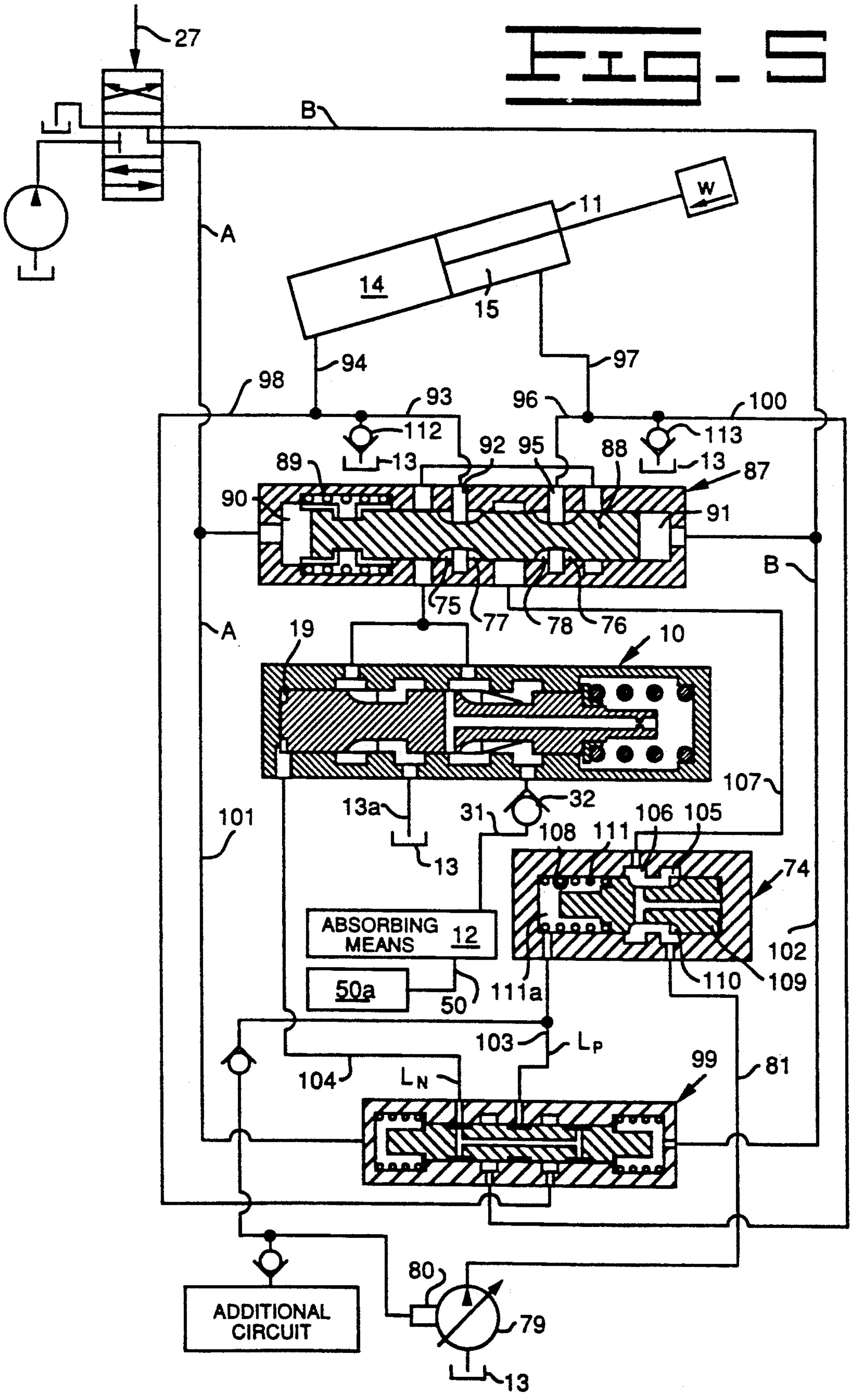
FIG. 5 is longitudinal section view of the compensating control of FIG. 1 together with the sectional view of a direction control valve, positive load compensator and external logic with negative load energy converting device, fluid motor, system pump and power transmitting lines shown schematically.

Referring now to FIG. 5, the control components of FIG. 5 are very similar to those of FIG. 1, like components being designated by like numerals. However, variable orifice means 24 of FIG. 1 is substituted in FIG. 5 by a direction control valve assembly generally designated as 87. The direction control spool 88 of FIG. 5 includes metering ports 75, 76, 77 and 78 and is centered by a biasing spring 89 towards its neutral position. The direction control valve assembly 87 being provided with a first chamber 90, subjected to pressure of control signal A and a second chamber 91, subjected to pressure of control signal B. The control signals A and B may be generated by any conventional means, such as, a hydraulic pilot system or proportional solenoid valves. First cylinder port 92, of the direction control valve assembly 87, is connected by lines 93 and 94 to the piston chamber 14, while second cylinder port 95 is connected by lines 96 and 97 to the piston rod chamber 15. The piston chamber 14 is also connected by lines 94 and 98 to an external logic module, generally designated as 99, which is also connected by lines 97 and 100 to the piston rod chamber 15. The external logic module 99 is also connected by lines 101 and 102 to the pressure of control signals A and B and is operable to generate a positive load control pressure signal $L_P$ which is transmitted through line 103 to the positive load compensator 74 and negative load control pressure signal $L_N$ which is transmitted through line 104 to the first control chamber 19 of the valve assembly 10 of both FIGS. 1 and 6.

Positive load compensator 74 is shown in detail in FIG. 5 and is provided with a chamber 105 connected by discharge line 81 to the system pump 79, a supply chamber 106 connected by line 107 to the direction control valve assembly 87. The supply chamber 106 cooperates with a bore 108 which slidably guides a throttling spool 109. The throttling spool 109 is provided with throttling ports 110 and is biased towards the position shown by a control spring 111 contained in space 111*a*. Lines 98 and 100 are connected by anticavitational valves 112 and 113 for one way fluid flow with reservoir means 13.

Figure 6:
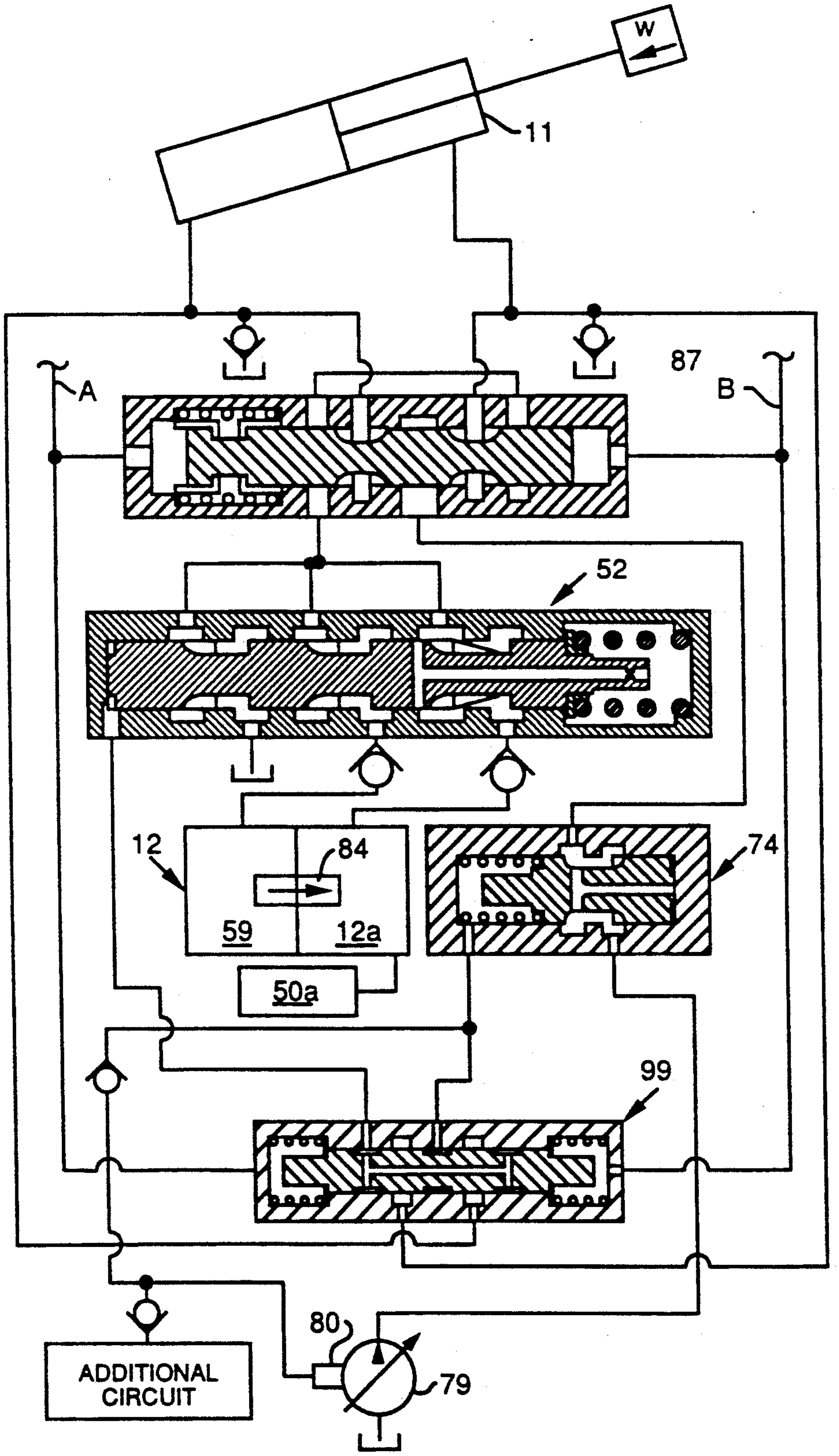
FIG. 6 shows a system using components identical to those of FIG. 5, but provided with the negative load compensating control of FIG. 4.

Referring now to FIG. 6, the fluid power and control system of FIG. 6 is very similar to that of FIG. 5, like components being designated by like numerals. The basic difference between the systems of FIG. 6 and FIG. 5 is that the valve assembly 10 of FIG. 5 is substituted by the control valve 52 of FIG. 4, with the control valve 52 being connected to converting means 12*a* and accumulator means 59.

Referring now back to FIG. 1, the fluid power and control system of FIG. 1 shows an energy recovery type valve provided with the feature of compensation. The feature of compensation is characterized by the fact that the flow from the source of pressure fluid is made proportional to the pressure differential across a variable control orifice, although it can be achieved in a number of different ways, which will be described later in this specification. With a constant pressure differential being maintained across such an orifice, the flow through the orifice becomes directly proportional to the area of the orifice, irrespective of the magnitude of the fluid pressure supplied from the source of fluid pressure.

If the source of fluid pressure is a pump, the energy in the form of fluid flow at a specific pressure, is supplied through the compensating control to the fluid motor, which then controls a resistive or positive type load. In such a system, in order to control the velocity of the load, the constant pressure differential across the variable orifice is maintained by the throttling process, which converts fluid power energy into heat. Without exception, all of the controls of the present art known use this type of control. This type of conversion of fluid power energy into heat is irreversible and the ability of the fluid power energy to perform useful work in a fluid power and control system is lost. Since the control pressure differential across a variable orifice, which is converted by throttling into heat, represents only a very small percentage of the total pressure available at the pump outlet, the conversion to heat by throttling represents only a small percentage of the total power developed by the pump. Therefore, a very large percentage of the total power can be used in control of a positive type load, without being converted to heat. The principle of operation of such positive load compensating controls is known in the art, as shown in U.S. Pat. No. 3,470,694 issued to T. Budzich on Oct. 7, 1969.

Since the pressure differential determines the amount of fluid power energy converted to heat, the level of the pressure differential has a great influence on the efficiency of the system and therefore should be kept as low as possible. However, since the level of the pressure differential determines the gain and therefore the response of the compensated control, the selection of this level always represents a compromise. By variation in this level of the pressure differential, during controlling action of the control of a resistive type load, as long as this pressure differential is maintained constant at any specific level, very beneficial results can be obtained and the flow through the variable orifice can be controlled by two parameters and those are areas of the orifice and the level of the pressure differential.

When the source of pressure is a fluid motor, subjected to an aiding or negative type load, all the fluid power controls, including compensating type controls of the present art, are based on the principle of fully throttling the fluid power energy of the negative type load, thereby converting all the energy into heat. The compensating controls of negative type loads, based on the principle of constant pressure differential, are known in the art as shown by U.S. Pat. No. 3,744,517 issued to T. Budzich on July 10, 1973.

In the embodiment of FIG. 1 the source of pressure fluid is the piston chamber 14 of the cylinder type fluid motor 11 that is subjected to negative load W. The fluid flow at negative load pressure, passes from piston chamber 14 through metering orifice means 24 to the valve assembly 10, which controls the pressure differential developed by throttling the fluid flow across the metering orifice means 24. Variable control orifice means 24, schematically shown on FIG. 1, may take many forms and the flow area of the orifice 25 can be varied in many ways by schematically shown means 26, in response to the external control signal 27. For example, metering orifice means 24 can be a throttling port of a direction control valve, well known in the art, in which case means 26 would take the form of a direction control spool or a balanced poppet. The displacement of the spool 35 is dictated by the magnitude of the external control signal 27. The control of the direction control spool or balanced poppet may be accomplished by varying the control pressure of fluid power generated external control signal 27, or a solenoid which controls the displacement of such spool or poppet in response to an electrical control signal, or a stepper motor, or any number of various mechanical, hydraulic, electrohydraulic or electrical devices, the simplest of those being just manual control input.

The negative load energy recovery control of the compensated type of FIG. 1 controls the pressure differential across variable orifice means 24, thus controlling the flow at negative load pressure from the piston chamber 14, in response to the external control signal 27, in turn controlling the velocity of the negative load W.

In the control of FIG. 1 the flow, passing through metering orifice means 24, can be diverted either by valve assembly 10 to fluid fluid exhaust means 13*a*, or to absorbing means 12, or to both, as long as the pressure differential across the control orifice means 24 is fully controlled.

Absorbing means 12 can take many forms, but it principally receives the fluid power energy at negative load pressure, without converting it to heat by throttling and delivers it by line 50 to other parts of the fluid power and control system schematically shown as 50*a*, where this energy, in the form of fluid power energy, can be made to perform useful work in control of resistive or positive type loads, without being converted into heat and therefore not only increases the efficiency of the system, but also increases the capability of such a system to perform useful work. These benefits are obtained in the control of FIG. 1, without degrading in any way whatsoever the quality of the control of the negative load W.

Assume that variable orifice means 24, in response to the external control signal 27 is in the fully closed position. The negative load pressure from the piston chamber 14 is transmitted through lines 16 and 17 to port 18 and first control chamber 19 to act on the force generating means 35*b*, where it generates a force on first compensating spool means 35 equal to the product of the negative load pressure and the cross-sectional area of the first compensating spool means 35. Since the downstream side of the variable orifice means 24 is connected through line 20, first inlet chamber 21, first throttling slots 37, exhaust chamber 29 and line 30*a* to the fluid exhaust means 13*a*, first compensating spool means 35 moves all the way to the right against the biasing force of spring biasing means 43, isolating first and second inlet chambers 21 and 23 by first and second cut-off edges 38 and 42 from the exhaust chamber 29 and also from the bypass chamber 30. The downstream side of the variable orifice means 24 is also simultaneously connected through line 22, second inlet chamber 23, passages 44 and 45 and damping orifice 46 to the second control chamber 33, which is maintained either at an intermediate low pressure, or atmospheric pressure through various types of leakage means, well-known in the art.

Assume that variable orifice means 24 is actuated in response to the external control signal 27 to provide a certain specific area of flow through the orifice 25 which corresponding to a specific velocity of the negative load W. Assume also that in the first mode of operation the flow absorbing capability of absorbing means 12 is higher than that dictated by the area of flow of the orifice 25. Then the pressure in line 20 will rise automatically transmitting this higher pressure through line 22, second inlet chamber 23, passages 44 and 45 and damping orifice 46 to the second control chamber 33. The pressure in the second control chamber 33 reacting on the cross-sectional area of first compensating spool means 35, together with biasing force of spring biasing means 43, moves the first compensating spool means 35 into a modulating position in a well-known manner, controlling by throttling fluid flow at negative load pressure from the second inlet chamber 23 to the bypass chamber 30 and through the first duct means 31 and check valve means 32 to the absorbing means 12. This control of the fluid flow maintains the pressure differential developed by throttling across control orifice means 24 at a level equivalent to the biasing load of spring biasing means 43. In this control mode, the amount of throttling at the first control throttling means 40 is determined by how much the flow absorbing capacity of absorbing means 12 exceeds the flow rate, as determined by the flow area setting of metering orifice means 24. The smaller this difference the smaller the amount of throttling done by first control throttling means 40. In its modulating position, the first compensating spool means 35 is subjected to the force generating means 35*b* established by the cumulative effect of pressures in the first control chamber 19, the second control chamber 33, and the biasing force of spring biasing means 43.

Assume that in the second mode of operation the rate of flow, as determined by the setting of the metering orifice means 24, equals the flow absorbing capability of absorbing means 12. Then the first compensating spool means 35 moves further from right to left, with the flow to absorbing means 12 being diverted by first flow diverting means 39. The first flow diverting means 39 includes the first low resistance flow passage 39*a*. The low resistance flow passage 39*a* permits the transmittal of flow from the second inlet chamber 23 to the bypass chamber 30 at minimum resistance level and can be in many forms. The flow transfer at negative load pressure less the pressure differential across metering orifice means 24 is then delivered to absorbing means 12, with absolutely minimum throttling loss, thus permitting maximum recovery of the energy of the negative load in the form of fluid power energy. The fluid power energy then can be utilized to perform useful work in the fluid power and control system 50*a*. There are different ways and means of changing the flow absorbing capacity of absorbing means 12 in such a way that the flow to absorbing means 12 is transferred with a minimum amount of throttling, thus permitting maximum utilization of the energy of the negative load in fluid power form. While working in the first and second modes of operating first cut-off edge 38 fully isolates the first inlet chamber 21 from the exhaust chamber 29, thus isolating the piston chamber 14 from fluid exhaust means 13*a*.

Assume that in the third mode of operation the flow from the piston chamber 14, as determined by the setting of metering orifice means 24, exceeds the flow absorbing capability of absorbing means 12. Then first compensating spool means 35 moves further from right to left, throttling, by fully throttling means 36, the difference between the flow passing through metering orifice means 24 and the flow diverted through first flow diverting means 39 to absorbing means 12. In this new modulating position fully throttling means 36 fully converts by throttling into heat the energy, the excess flow that absorbing means 12 is not capable of absorbing, while the integrity of the compensating control in this mode of operation is not affected.

Assume that in the fourth mode of operation, the flow absorbing capability of absorbing means 12 is zero. Then first compensating spool means 35 moves further to the left, fully throttling and therefore converting to heat, by fully throttling means 36, all of the energy of the negative load as determined by the flow setting of the metering orifice means 24. Consequently, all the energy of the negative load that is converted into heat with fluid flow is passed to the fluid exhaust means 13*a*. This converting of fluid flow to the fluid exhaust means 13*a* is the normal operation of the state of the art compensating control as shown by U.S. Pat. No. 3,744,517 issued to T. Budzich on July 10, 1973.

As stated above in the second mode of operation, in which the maximum amount of negative load energy is recovered to perform useful work, the only throttling loss takes place due to the pressure differential controlled by throttling across metering orifice means 24.

One of the most important features of the negative load compensating and diverting control of FIG. 1 is that the negative load energy recovery circuit, part of which is recovery means 51 and absorbing means 12, has absolute priority, due to the first flow priority means 35*a*, over the fully throttling means 36 connected to fluid exhaust means 13*a*. Therefore, on a priority basis, all of the energy of the negative load is recovered first and only the excess energy, which cannot be used, is fully throttled and converted to heat.

Another important advantage of the control of FIG. 1 is the reduction in throttling in modes one, two and three, with the corresponding reduction in the flow forces, acting on the compensating spool 35 of the valve assembly 10, being substantially reduced, with no significant flow forces existing in mode two. This results in a compensated control with much improved control characteristics than that of the state of the art compensating controls, in which the full amount of fluid power energy of the negative load is always converted to heat and therefore such controls are subjected to maximum flow forces.

Referring now back to FIG. 2, the fluid power and control system of FIG. 2 performs an identical function and works in an identical way, as that described in detail when referring to FIG. 1, the fluid flow from the fluid motor 11 is controlled by variation in the area of variable orifice means 24, while the pressure differential, across the variable orifice 25, is maintained at a relatively constant level by the valve assembly 10. The area of variable orifice means 24 is varied in response to the external control signal 27, which, depending on the specific application or the type of the fluid power and control system, can take many forms. In systems interfaced with electronic computing circuits the external control signal 27*a* can be of an electrical digital type, or signal 27*b* can be of an electrical analog type. Such signals will be transformed into mechanical linear or rotational motion by means 26*a* or 26*b*, in order to control the area of the variable orifice 25. In other systems, this area can be varied by fluid power type external control signals 27*c*, or mechanical type external control signals 27*d*, using means 26*c* or 26*d*.

Referring now back to FIG. 3, the fluid power and control system of FIG. 3 uses an identical valve assembly 10*a* as that of FIG. 1, but with flow passages 44 and 45 not provided in compensating spool 35. The control valve of FIG. 3 is of a two state type and uses a first stage 16*d*, provided with signal amplifying means 16*c*. The first stage means 16*d* could be a torque motor driven flapper-nozzle control, well known in the art. The control arrangement of FIG. 3 shows a servo system of a closed loop type. In such a system, the sensing means 24*a* may be any device measuring directly, or indirectly fluid flow out of the fluid motor 11. The direct flow measurement may be obtained by use of any type of flow meter or through the use of orifice means 24, if available. The measurement of fluid flow can also be indirectly established by measuring the displacement or velocity of the piston rod of a cylinder type fluid motor, once the dimensions of such motor are known, see means 24*b*, or by measuring the angular displacement, or angular velocity of a rotary type fluid motor, once the volume displacement per revolution of such motor is known, see means 24*d*. Sensing means 24*a* is provided with signal generating means 24*e* and 24*c*, which generate a control signal proportional to fluid flow out of the fluid motor and as stated above can be derived from either direct measurement of fluid flow, linear displacement or velocity of the load, or angular displacement, or angular velocity of the load. The resulting control signal can be transmitted, in a well known manner, using conventional state of the art components, in electrical form as control signal $F_1$, $F_2$, $F_3$, or $F_4$, to amplifying means 16*a*, which produce signal $F_a$, which in the control arrangement of FIG. 3 is a feedback signal. In a well-known manner, third means 16*b*, responsive to command signal C (external control 27), can be in the form of a differential amplifier 16*b*, well-known in the art, which in response to command signal C and feedback signal $F_a$ produces an analog control signal 27*b*, which is the error signal of the servo system.

Referring back to FIG. 4, the negative load pressure is generated in the piston chamber 14 of the cylinder type fluid motor 11 and is connected by line 16 through metering orifice means 24, described in great detail when referring to FIG. 1, to the control valve 52. In control valve 52, which is very similar to the valve assembly 10 of FIG. 1, third inlet chamber 60 and bypass chamber 56 are interposed between the exhaust chamber 29 and second inlet chamber 23 of FIG. 1 and second flow diverting means 61 together with second control throttling means 62, having third throttling slots 63 and third cut-off edges 64 are used to functionally interconnect third inlet chamber 60 and bypass chamber 56. With the variable control orifice 25 closed, second compensating spool means 55 is displaced all the way to the right, in a manner as described in FIG. 1.

In the first mode of operation of the control system of FIG. 4, it is assumed that the absorbing capacity of converting means 12*a* is higher than the controlled flow, as dictated by the flow area of metering orifice means 24. Then, the throttling action of first control throttling means 40 is identical to that as described when referring to FIG. 1.

In the second mode of operation of the control system of FIG. 4, it is assumed that the flow absorbing capability of converting means 12*a* is equal to the controlled flow, as determined by the setting of the metering orifice means 24 and, in a manner as described when referring to FIG. 1, the total flow at negative load pressure, less the pressure differential throttled in metering orifice means 24, is delivered to converting means 12*a* and the other branch of the fluid power and control system 50*a*, capable of using this fluid power energy in control of resistive, or positive type loads.

In the third mode of operation of the control system of FIG. 4, with the converting means 12*a* incapable of absorbing full flow at control level, the second compensating spool means 55 moves further to the left, with second control throttling means 62 throttling the fluid flow and diverting it through second duct means 57 and second check valve means 58 to accumulator means 59. Therefore, in this mode of operation the excess flow, equal to the difference between the flow controlled at the metering orifice means 24 and the flow being absorbed by converting means 12*a*, is diverted to accumulator means 59, gradually filling the accumulator. Accumulator means 59 and converting means 12*a* constitute absorbing means 12.

In the fourth mode of operation of the control system of FIG. 4, with accumulator means 59 full, second compensating spool means 55 moves further to the left and throttles, by fully throttling means 36, fluid flow, equal to the difference between the flow as determined by metering orifice means 24 and the flow absorbed by converting means 12*a*, directly to fluid exhaust means 13*a*. The total energy of the excess flow to the fluid exhaust means 13*a* is converted into heat and passed with the flow directly to reservoir means 13.

The introduction of second flow diverting means 61 and second control throttling means 62 delivering the flow to accumulator means 59 results in much better utilization of the energy of the negative load. By introducing an additional mode of operation of the control, additional storage of energy of the negative load in a reversible form in accumulator means 59 is provided, which otherwise, with the use of valve assembly 10 of FIG. 1, would be fully converted into heat. Accumulator means 59, in the form of various types of accumulators of the present art, store fluid power energy either by compressing a mechanical spring or by further compressing a volume of compressed gas, divided by a bladder type elastomeric floating barrier from the system oil. When charging the accumulator means 59 by the introduction of flow, the pressure of oil in the accumulator means 59 is gradually increased up to a specific maximum level. Therefore, in the process of storing the fluid power energy in an accumulator type device, at the beginning of the filling process, a comparatively large amount of energy is converted by second control throttling means 62 into heat, this amount of throttling being gradually reduced, as the accumulator means 59 is being filled, and the difference between negative load pressure and the gas charge pressure of the accumulator is reduced. Therefore, utilization of negative load energy by absorbing means 12 and second circuit 50*a* can be much more efficient than the inherently inefficient process of storing this energy in the accumulator. However, any excess flow, which cannot be absorbed by converting means 12*a* in the arrangement of FIG. 4 is stored in accumulator means 59 and can be used during part of the duty cycle of the machine, which does not control negative type loads.

In the fifth mode of operation of the control system of FIG. 4, all the negative load energy is throttled by fully throttling means 36. This is the condition in which the converting means 12*a* cannot absorb any flow and accumulator means 59 is full. This fifth mode of operation of FIG. 4 is identical to the fourth mode of operation of FIG. 1 and was described in great detail when referring to FIG. 1.

The control arrangement of FIG. 4, and the control arrangement of FIG. 1 have one basic common advantage and that is the priority feature permitting utilization of negative load energy first, before throttling it to fluid exhaust means 13*a*. The arrangement of FIG. 4 has first flow priority means 55*a* operable to divert flow at negative load pressure to converting means 12*a*, second flow priority means 55*b* operable to divert the negative load energy to accumulator means 59, and third flow priority means 55*c* operable to divert negative load energy to converting means 12*a*, once accumulator means 59 is full and only after the first, second and third priorities are satisfied can the excess fluid flow be fully throttled to the reservoir means 13.

The advantage resulting from either reduction, or elimination of flow forces acting on first and second compensation spools means 35 and 55 of FIGS. 1 and 4, obtained by reduction in the amount of throttling, results in improvement in the control characteristics of those controls.

Check valve means 32 in FIG. 1 and check valves means 32 and 58 in FIG. 4 were introduced to prevent any back flow from converting means 12*a* and the accumulator means 59 of absorbing means 12 to piston chamber 14, which would disturb the proportionality of the control. The flow from accumulator means 59 being the most harmful. Converting means 12*a* and accumulator means 59 are interconnected, for fluid flow, by control and transfer means 84. Once the pressure level in converting means 12*a* drops below the pressure level of the fluid in accumulator means 59, pressurized fluid from accumulator means 59 transfers to the converting means 12*a*.

Referring back to FIG. 5, the control arrangement of FIG. 5 is similar to that of FIG. 1 with variable orifice 25 in FIG. 5 being substituted by direction control valve assembly 87, well-known in the art. The direction control valve assembly 87 is provided with first and second chambers 90 and 91 and biasing spring 89. The biasing spring 89, in a well-known manner, biases the direction control spool 88 towards the neutral position. The direction control spool 88 is displaced from its neutral position in either direction by subjecting the first chamber 90 to control pressure signal A or the second chamber 91 to control pressure signal B.

The positive load compensator 74 is of a form well-known in the art which, in a well-known manner, by the use of throttling port 110 positioned on the spool 109, throttles the fluid flow supplied from system pump 79 through discharge line 8 to maintain a constant pressure differential across variable orifice means created by displacement of metering port 77 or 78 of the direction control spool 88. In a well-known manner, the throttling spool 109 of the positive load compensator 74 is subjected to the biasing force of control spring 111 and positive load pressure $L_P$ in space 111*a*, which is supplied from external logic module 99.

The external logic module 99 is operable to identify whether the fluid motor 11 is subjected to positive or negative load pressure and to transmit either a positive load pressure $L_P$ control signal to the space 111*a* of the positive load compensator 74, or a negative load pressure $L_N$ control signal to the first control chamber 19. The external logic module 99 is subjected to control pressure signals A and B and the pressures in piston chamber 14 and piston rod chamber 15. Additional details of the external logic module 99 may be obtained by reviewing U.S. Pat. No. 4,610,194 issued to T. Budzich on Sept. 9, 1986.

Referring back to FIG. 6, the control arrangement of FIG. 6 is very similar to that of FIG. 5 with the exception that valve assembly 10 of FIG. 5 is substituted by the control valve 52 of FIG. 4 and absorbing means 12 is supplemented by accumulator means 59 and converting means 12*a*.

Although the preferred embodiments of this invention have been shown and described in detail, it is recognized that the invention is not limited to the precise form and structure shown. Various modifications and rearrangements, as will occur to those skilled in the art upon full comprehension of this invention, may be resorted to without departing from the scope of the invention as defined in the claims.

I claim:

1. A fluid power and control system having a valve assembly (10) interposed between an outlet port (11*a*) of a fluid motor (11) controlling a negative type load and subjected to negative load pressure, fluid exhaust means (13*a*) maintained at a relatively low pressure level and absorbing means (12) maintained at a relatively high variable pressure level during control of said negative load, said valve assembly (10) comprising flow control means (51*a*) operative to control the velocity of fluid flow from said fluid motor (11) in response to an external control signal (27) so that the velocity of said fluid motor (11) can be controlled at a relatively constant level proportional to the magnitude of the external control signal (27) and independent of the magnitude of the negative load pressure, said flow control means (51*a*) including flow sensing means (24*a*) for sensing the magnitude of the fluid flow from the fluid motor (11), fully throttling means (36) for directing fluid flow from the fluid motor (11) to the fluid exhaust means (13*a*) and recovery means (51) for diverting on a priority basis fluid flow from the fluid motor (11) to said absorbing means (12) said recovery means (51) being operatively responsive to said flow sensing means (24*a*).

2. A fluid power and control system as set forth in claim 1 wherein said flow sensing means (24*a*) includes means (24*b*) responsive to linear velocity of said fluid motor (11) of a cylinder type.

3. A fluid power and control system set forth in claim 1 wherein said fluid motor (11) is of a includes means (24*b*) responsive to linear velocity of said fluid motor (11) and control signal generating means (24*e*) operable to generate a control signal ($F_1$) representative of the linear velocity of the fluid motor (11).

4. A fluid power and control system as set forth in claim 3 wherein said control signal generating means (24*e*) includes fluid power amplifying means (16*a*) operable to generate and direct a fluid power control signal (27*e*) to said flow control means (51*a*).

5. A fluid power and control system as set forth in claim 4 wherein said flow control means (51*a*) has second means (51*e*) responsive to said fluid power control signal (27*e*).

6. A fluid power and control system as set forth in claim 5 wherein said control signal generating means (24*e*) is provided with third means (16*b*) responsive to a command signal (C) said control signal generating means (24*e*) operable to vary said fluid power control signal (27*e*) whereby fluid flow from said motor (11) and velocity of said load can be varied in response to said command signal (C), while remaining relatively constant at each selected level and relatively independent of the change in the magnitude of said load (W).

7. A fluid power and control system as set forth in claim 1 wherein said flow sensing means (24*a*) includes means (24*d*) responsive to angular velocity of said fluid motor (11) of a rotary type.

8. A fluid power and control system as set forth in claim 1 wherein said fluid motor (11) is of a rotary type and said flow sensing means (24*a*) includes means (24*d*) responsive to angular velocity of said fluid motor (11) and control signal generating means (24*c*) operable to generate a control signal ($F_2$) representative of the angular velocity of the fluid motor (11).

9. A fluid power and control system as set forth in claim 8 wherein said control signal generating means (24*c*) includes fluid power amplifying means (16*a*) operable to generate a fluid power control signal (27*e*) to said flow control means (51*a*).

10. A fluid power and control system as set forth in claim 9 wherein said flow control means (51*a*) has second means (51*e*) responsive to said fluid power control signal (27*e*).

11. A fluid power and control system set forth in claim 10 wherein said control signal generating means (24*c*) is provided with third means (16*b*) responsive to a command signal (C) said control signal generating means (24*c*) operable to vary said fluid power control signal (27*e*) whereby fluid flow from said motor and velocity of said load can be varied in responsive to said command signal (C), while remaining relatively constant at each selected level and relatively independent of the change in the magnitude of said load (W).

12. A fluid power and control system as set forth in claim 1 wherein said flow sensing means (24*a*) includes metering orifice means (24) and means (27*f*) operable to sense control pressure differential across said metering orifice means (24).

13. A fluid power and control system as set forth in claim 12 wherein said metering orifice means (24) includes means (26) responsive to the external control signal (27) and operable to vary the flow area of said metering orifice means (24) in response to said external control signal (27) whereby fluid flow from said motor (11) and velocity of said load can be varied in response to said external control signal (27) while remaining relatively constant at each selected level.

14. A fluid power and control system as set forth in claim 13 wherein said means (26) responsive to said external control signal (27) includes means (26a) responsive to an electrical digital type control signal (27a).

15. A fluid power and control system as set forth in claim 13 wherein said means (26) responsive to said external control signal (27) includes means (26b) responsive to an electrical analog type control signal (27b).

16. A fluid power and control system as set forth in claim 13 wherein said means (26) responsive to said external control signal (27) includes means (26c) responsive to a fluid power type control signal (27c).

17. A fluid power and control system is set forth in claim 13 where said means (26) responsive to said external control signal (27) includes means (26d) responsive to a mechanical type control signal (27d).

18. A fluid power and control system is set forth in claim 1 wherein said flow control means (51a) includes first flow priority means (35a) operable to establish priority of fluid flow from said fluid motor (11) through said recovery means (51) to said absorbing means (12) and when fluid flow absorbing capacity of said absorbing means (12) is reached to divert excess fluid flow from said flow motor (11) to said fully throttling means (36).

19. A fluid power and control system as set forth in claim 1 wherein said recovery means (51) includes first control throttling means (40) and first fluid flow diverting means (39).

20. A fluid power and control system as set forth in claim 1 wherein said absorbing means (12) includes converting means (12b), said recovery means (51) includes first control throttling means (40) and first fluid flow diverting means (39), first duct means (31) interconnecting for fluid flow said first flow diverting means (39) and the converting means (12a) in said absorbing means (12), and check valve means (32) in said first duct means (31) operable to permit fluid flow to said converting means (12a) and prevent reverse fluid flow from said converting means (12a) to said first flow diverting means (39).

21. A fluid power and control system as set forth in claim 1 wherein said absorbing means (12) includes converting means (12b) and accumulator means (59), said recovery means (51) includes first control throttling means (40), first flow diverting means (39), second control throttling means (62) and second flow diverting means (61), first ducting means (31) interconnecting for fluid flow said first flow diverting means (39) and the converting means (12a) in said absorbing means (12), and second duct means (57) interconnecting for fluid flow said second flow diverting means (61) and the accumulator means (59) in said absorbing means (12).

22. A fluid power and control system as set forth in claim 21 wherein said flow control means (51a) includes second flow priority means (55b) operable to establish priority of fluid flow from said fluid motor (11) converting means (12a) and once the flow absorbing capacity of said converting means (12a) is reached to divert excess fluid flow from said fluid motor (11) to said accumulator means (59).

23. A fluid power and control system as set forth in claim 1 wherein said absorbing means (12) includes converting means (12b) and accumulator means (59), said recovery means (51) includes first control throttling means (40), first flow diverting means (39), second control throttling means (62) and second flow diverting means (61), first duct means (31) interconnecting for fluid flow said first flow diverting means (39) and the converting means (12a) in said absorbing means (12), second duct means (57) interconnecting for fluid flow said second flow diverting means (61) and the accumulator means (59) in said absorbing means (12), first check valve means (32) in said first duct means (31) and second check valve means (58) in said second duct means (57), said first (32) and said second (58) check valve means operable to prevent reverse fluid flow from said converting means (12a) and said accumulator means (59) to said first (39) and said second (61) flow diverting means.

24. A fluid power and control system as set forth in claim 1 wherein said flow control means (51a) has first compensating spool means (35), said recovery means (51) and said fully throttling means (36) being positioned on said spool means (35), force generating means (35b) on said spool means (35) being responsive to said negative load pressure and spring biasing means (43) opposing the force generated by said force generating means (35b).

25. A fluid power and control system as set forth in claim 1 wherein said flow control means (51a) includes first compensating spool means (35), said recovery means (51) and said fully throttling means (36) being positioned on said spool means (35).

26. A fluid power and control system as set forth in claim 25 wherein said absorbing means (12) includes converting means (12a), said recovery means (51) includes said first control throttling means (40) and first flow diverting means (39), first duct means (31) interconnecting for fluid flow said first flow diverting means (39) and the converting means (12a) in said absorbing means (12), and first priority means (55a) operable to establish priority of fluid flow from said fluid motor (11) through said first flow diverting means (39) to said converting means (12a) and when the fluid flow absorbing capacity of said converting means (12a) is reached to divert excess fluid flow from said fluid motor (11) to said fully throttling means (36).

27. A fluid power and control system as set forth in claim 25 wherein said absorbing means (12) includes converting means (12a) and accumulator means (59), said recovery means (51) includes first control throttling means (40), first flow diverting means (39), second control throttling means (62) and second flow diverting means (61), first duct means (31) interconnecting for fluid flow said first flow diverting means (39) and the converting means (12a) in said absorbing means (12), second duct means (57) interconnecting for fluid flow said second fluid flow diverting means (61) and the accumulator means (59) in said absorbing means (12) and second priority means (55b) operable to establish priority of fluid flow from said fluid motor (11) through said first flow diverting means (39) to said converting means (12a) and when the fluid flow absorbing capacity of said converting means (12a) is reached to divert excess fluid flow from said fluid motor (11) to said fluid flow diverting means (61).

28. A fluid power and control system as set forth in claim 27 wherein said spool means (55) has third priority means (55*c*) operable to divert excess fluid flow from said fluid motor (11) which cannot be absorbed by said converting means (12*a*) and said accumulator means (59) to said fully throttling means (36).

* * * * *

UNITED STATES PATENT AND TRADEMARK OFFICE
CERTIFICATE OF CORRECTION

PATENT NO. : 5,152,142

DATED : October 6, 1992

INVENTOR(S) : Tadeusz Budzich

It is certified that error appears in the above-identified patent and that said Letters Patent is hereby corrected as shown below:

In claim 3, column 16, line 12, before the word "includes" insert --cylinder type and said flow sensing means (24a)--

In claim 22, column 17, line 68, after "motor (11)" insert --to said--.

Signed and Sealed this

Second Day of November, 1993

Attest:

BRUCE LEHMAN

Attesting Officer

*Commissioner of Patents and Trademarks*